(12) United States Patent
Schaefer (10) Patent No.: US 12,523,493 B2
(45) Date of Patent: Jan. 13, 2026

(54) SYSTEM AND METHOD FOR GENERATING A SEMANTIC MAP FOR A ROAD

(71) Applicant: Woven by Toyota, Inc., Tokyo (JP)

(72) Inventor: Alexander Christoph Schaefer, Fremont, CA (US)

(73) Assignee: Woven By Toyota, Inc., Tokyo (JP)

( * ) Notice: Subject to any disclaimer, the term of this patent is extended or adjusted under 35 U.S.C. 154(b) by 234 days.

(21) Appl. No.: 18/078,303

(22) Filed: Dec. 9, 2022

(65) Prior Publication Data

US 2024/0192019 A1   Jun. 13, 2024

(51) Int. Cl.
*G01C 21/00* (2006.01)

(52) U.S. Cl.
CPC ...... *G01C 21/3815* (2020.08); *G01C 21/3811* (2020.08); *G01C 21/3848* (2020.08)

(58) Field of Classification Search
CPC ............ G01C 21/3815; G01C 21/3811; G01C 21/3848
See application file for complete search history.

(56) References Cited

U.S. PATENT DOCUMENTS

| | | | |
|---|---|---|---|
| 2017/0072951 A1* | 3/2017 | Sakaguchi | B60W 30/143 |
| 2017/0327123 A1* | 11/2017 | Tokimasa | B60R 21/00 |
| 2018/0231387 A1* | 8/2018 | Thiel | G01C 21/3811 |
| 2020/0272833 A1* | 8/2020 | Jiang | G06T 7/11 |
| 2021/0096573 A1* | 4/2021 | Yu | G05D 1/0219 |
| 2021/0404835 A1* | 12/2021 | Kim | G01C 21/3641 |
| 2022/0230019 A1* | 7/2022 | Bande | G01C 21/188 |

FOREIGN PATENT DOCUMENTS

CN    106802954 A    6/2017

OTHER PUBLICATIONS

Deng et al., "Generating urban road intersection models from low-frequency GPS trajectory data", International Journal of Geographical Information Science, 2018, pp. 2337-2361, vol. 32, No. 12.

\* cited by examiner

*Primary Examiner* — Anne Marie Antonucci
*Assistant Examiner* — Patrick M Brady
(74) *Attorney, Agent, or Firm* — Christopher G. Darrow; Darrow Mustafa PC (57) ABSTRACT

Systems, methods, and other embodiments described herein relate to generating a semantic map for a road portion. In one embodiment, a method includes receiving sensor data related to a road portion. The sensor data includes trace points and key points associated with the trace points. The trace points are related to positions of a vehicle in the road portion and the key points are related to lane boundaries. The method includes determining a relationship between the trace points based on the key points and determining characteristics of the road portion based on the relationship.

20 Claims, 10 Drawing Sheets

SYSTEM AND METHOD FOR GENERATING A SEMANTIC MAP FOR A ROAD

TECHNICAL FIELD

The subject matter described herein relates, in general, to systems and methods for generating a semantic map for a road.

BACKGROUND

Semantic road maps include information about a road, such as the number of lanes, the lane widths, and the lane boundaries of the road. Semantic road maps may facilitate autonomous vehicle operation. However, semantic road maps are typically generated using methods that are both labor and resource intensive.

SUMMARY

In one embodiment, a system for generating a semantic map for a road portion is disclosed. The system includes a processor and a memory in communication with the processor. The memory stores machine-readable instructions that, when executed by the processor, cause the processor to receive sensor data related to a road portion. The sensor data includes a plurality of trace points and a plurality of key points associated with the plurality of trace points. The plurality of trace points is related to positions of a vehicle in the road portion and the plurality of key points is related to lane boundaries. The machine-readable instructions further include machine-readable instructions that, when executed by the processor, cause the processor to determine a relationship between the plurality of trace points based on the plurality of key points and determine characteristics of the road portion based on the relationship.

In another embodiment, a method for generating a semantic map for a road portion is disclosed. The method includes receiving sensor data related to a road portion. The sensor data includes a plurality of trace points and a plurality of key points associated with the plurality of trace points. The plurality of trace points is related to positions of a vehicle in the road portion and the plurality of key points is related to lane boundaries. The method further includes determining a relationship between the plurality of trace points based on the plurality of key points and determining characteristics of the road portion based on the relationship.

In another embodiment, a non-transitory computer-readable medium for generating a semantic map for a road portion is disclosed. The non-transitory computer-readable medium includes instructions that, when executed by a processor, cause the processor to perform one or more functions. The instructions include instructions to receive sensor data related to a road portion. The sensor data includes a plurality of trace points and a plurality of key points associated with the plurality of trace points. The plurality of trace points is related to positions of a vehicle in the road portion and the plurality of key points is related to lane boundaries. The instructions include instructions to determine a relationship between the plurality of trace points based on the plurality of key points and determine characteristics of the road portion based on the relationship.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with systems and methods for generating a semantic map for a road are disclosed. A semantic map of a road includes the number of lanes along the road, the width of the lanes, the positions of lane markings, lane boundaries, lane edges, and/or intersection of lanes. The information included in the semantic map may facilitate autonomous vehicle operation.

Current methods of generating a semantic map for a road include image processing visual sensor data. However, these methods can be labor-intensive, time-consuming, expensive, and require extensive storage and computational resources as the prior art discloses detecting images, storing the images, and manually identifying and labelling objects and signage detected in the images. Prior art discloses generating semantic maps, which often involve significant manual labor, which can be time-consuming and expensive. These methods also have a high level of inaccuracies.

Accordingly, systems, methods, and other embodiments associated with generating a semantic map for a road are disclosed. The system generates a semantic map of the road in a given area based on ground-truth vehicle trace points and a road graph. This system generates the corresponding semantic representation for a road with characteristics such as single lane roads, multiple lane roads, and intersections.

As an example, the system receives sensor data from vehicle sensors (such as Toyota Safety Sense sensors) as vehicles travel along the road. The vehicle sensors such as Global Positioning Systems (GPS), inertial measurement unit (IMU), and accelerometers can include information about the location of the vehicle, known as trace points. Additionally, vehicle sensors that perceive an environment, such as cameras, LIDAR sensors, and radar sensors can include information about the location, such as lane markings, known as key points. Key points include left key points, which identify lane markings detected to the left of the vehicle sensor based on the direction of travel of the vehicle sensor(s). Key points also include right key points, which identify lane markings detected to the right of the vehicle sensor based on the direction of travel of the vehicle sensor(s).

The system determines a relationship between the trace points, two at a time. The system selects two trace points to determine the relationship between them using any suitable criteria, such as the trace points being proximate to each other or being neighboring trace points. The system determines and assigns a first value to the probability that the two trace points are in the same lane. As an example, the first value can be known as the ego value. The system determines and assigns a second value to the probability that the two trace points are in adjacent lanes. As an example, the second value can be known as the adjacent value. The system determines and assigns a third value to the probability that the two trace points are not in the same lane and are not in adjacent lanes. As an example, the third value can be known as the other value.

The system then determines the most probable relationship based on the highest of the first, second, and third values. The system groups trace points into lanes based on the determined relationships and then groups the key points based on the determined lanes. The system determines the positions of the lane markings based on the key point groups.

The embodiments disclosed herein present various advantages over conventional technologies that generate a semantic map for a road based on image processing. First, the embodiments can provide a more accurate prediction of the characteristics of the lanes, such as number of lanes, lane width, positions of lane markings, lane boundaries, road edges, and intersections. Second, the embodiments are less resource-intensive than the prior art. Third, the embodiments simplify the process of generating a semantic map for the road.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1A:
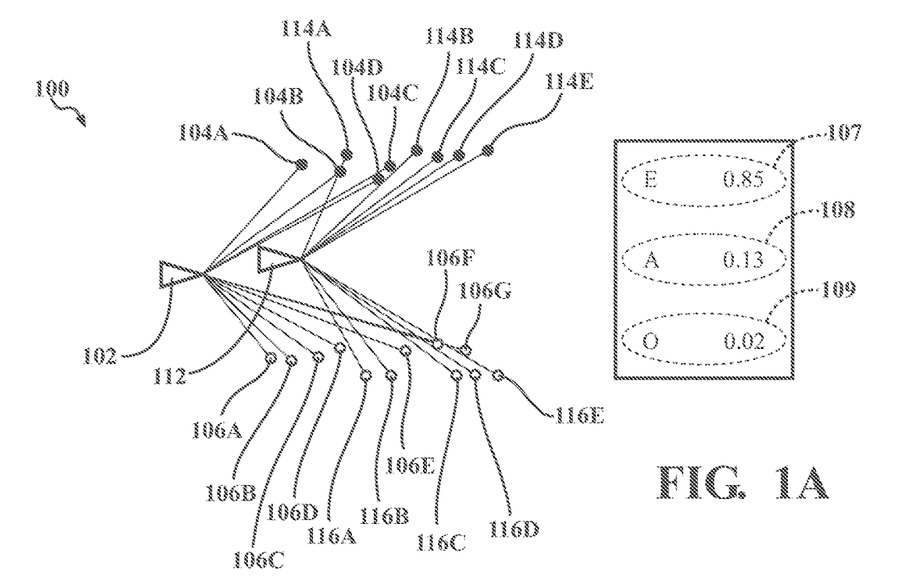
FIGS. 1A-1C illustrate an example of determining a relationship between two trace points based on key points associated with the trace points.
Figure 1B:
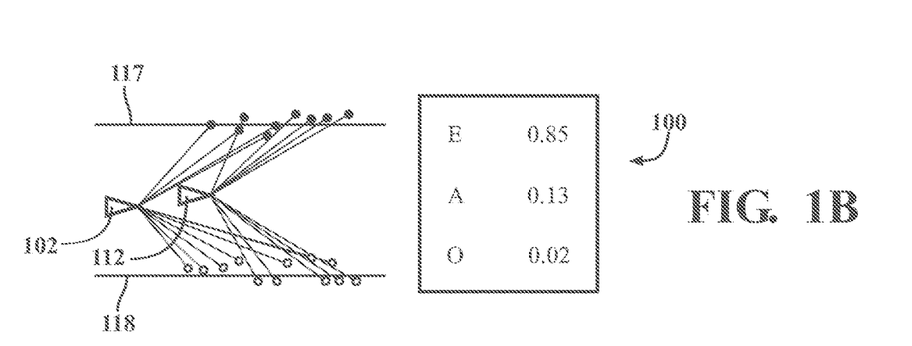
Figure 1C:
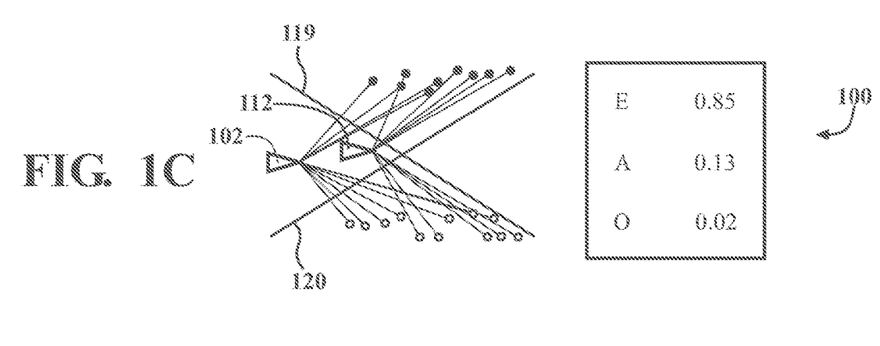

FIGS. 1A-1C illustrate an example of determining a relationship between trace points 102, 112 based on key points 104, 106, 114, 116 associated with the trace points 102, 112. The semantic map generating system 100 receives sensor data from any suitable sensors. As an example, the semantic map generating system 100 may receive sensor data from mobile sensors such as vehicle sensors and/or stationary sensors such as roadside sensors or infrastructure sensors.

As an example and as shown in FIG. 1A, sensor data includes trace points 102, 112 which identify the positions of a vehicle travelling across a road portion. The trace points 102, 112 may originate from a single vehicle travelling across the road portion. Alternatively, the trace points 102, 112 may originate from two vehicles travelling across the road portion. The sensor data includes left key points 104A, 104B, 104C, 104D (collectively known as 104), which identify a left boundary of a lane that the vehicle is traveling on. The sensor data includes right key points 106A, 106B, 106C, 106D, 106E, 106F, 106G (collectively known as 106), which identify a right boundary of the lane that the vehicle is traveling on. In this example, when the vehicle is at the trace point 102, sensors on the vehicle detect left lane markings at the left key points 104 and right lane markings at the right key points 106.

The sensor data includes left key points 114A, 114B, 114C, 114D, 114E (collectively known as 114), which identify a left boundary of a lane that the vehicle is traveling on. The sensor data includes right key points 116A, 116B, 116C, 116D, 116E (collectively known as 116), which identify a right boundary of the lane that the vehicle is traveling on. In this example, when the vehicle is at the trace point 112, sensors on the vehicle detect left lane markings at the left key points 114 and right lane markings at the right key points 116.

The semantic map generating system 100 determines the different relationships that can exist between the trace points 102, 112. The relationship between the trace points 102, 112 may be that the trace points are in a same lane, the trace points are in adjacent lanes, or the trace points are neither in the same nor in adjacent lanes. Adjacent lanes are neighboring lanes that are side-by-side and share a common lane boundary.

The semantic map generating system 100 determines three probability values 107, 108, 109. The semantic map generating system 100 determines a first probability value 107 (also known as the Ego probability value), indicating the probability that the trace points 102, 112 are in the same lane, a second probability value 108 (also known as the Adjacent probability value) indicating the probability that the trace points 102, 112 are in adjacent lanes, and a third probability value 109 (also known as the Other probability value) indicating the probability that the trace points 102, 112 are in two separate lanes, and the two separate lanes are not adjacent to each other.

The semantic map generating system 100 determines the first probability value 107 by fitting a curve or a line 117 to the left key points 104, 114 and a curve or a line 118 to the right key points 106, 116. The semantic map generating system 100 then assigns a score to the curves 117, 118 based on how closely the associated curves 117, 118 fit the key points 104, 114, 106, 116. The semantic map generating system may use any suitable method to fit the curves 117, 118 to the key points 104, 114, 106, 116 and determine a fit score. As an example, the semantic map generating system 100 may use a least squares method. The better the associated curves 117, 118 fit the key points 104, 114, 106, 116, the higher the first probability value 107, indicating that the trace points 102, 112 are in the same lane.

The semantic map generating system 100 determines the second probability value 108 by fitting a curve or a line 119 to the left key points 104 and the right key points 116 and by fitting a curve or a line 120 to the right key points 106 and the left key points 114. The semantic map generating system 100 then assigns a score to the curves 119, 120 based on how closely the associated curves 119, 120 fit the key points 104, 114, 106, 116. The semantic map generating system 100 may use any suitable method to fit the curves 119, 120 to the key points 104, 114, 106, 116 and determine a fit score. As an example and as previously mentioned, the semantic map generating system 100 may use a least squares method. The semantic map generating system 100 may select the curve 119, 120 with a better fit and determine the second probability value 108, indicating that the trace points are in adjacent lanes based on the curve 119, 120 with a better fit.

The semantic map generating system 100 determines the third probability value 109. The third probability value indicates the probability that the trace points 102, 112 have a relationship other than being in the same lane or being in adjacent lanes. As an example and as shown, the semantic map generating system 100 may determine the third probability value 109 by subtracting the sum of the first and second probability values from 1. Additionally and/or alternatively, the semantic map generating system 100 may determine four probability values—ego, right adjacent, left adjacent, and other. For determining the ego probability, which indicates the probability that the trace points 102, 112 are in the same lane, the semantic map generating system 100 fits two lines 117, 118 to the data: one line 117 to the left key points 104, 114 and one line 118 to the right key points 106, 116. For determining the right adjacent probability, which indicates that the trace points 102, 112 are in adjacent lanes with the first trace point 102 being in the left adjacent lane and the second trace point 112 being in the right adjacent lane, the semantic map generating system 100 fits three lines to the data: one line to the left key points 104 of the first trace point 102, one line 120 to the right key points 106 of the first trace point 102 and the left key points 114 of the second trace point 112, and one line to the right key points 116 of the second trace point 112. For determining the left adjacent probability, which indicates that the trace points 102, 112 are in adjacent lanes with the first trace point 102 being in the right adjacent lane and the second trace point 112 being in the left adjacent lane, the semantic map generating system 100 fits three lines to the data: one line to the left key points 114 of the second trace point 112, one line 119 to the right key points 116 of the second trace point 112 and the left key points 104 of the first trace point 102, and one line to the right key points 106 of the first trace point 102. For determining the other probability, which indicates that the trace points 102, 112 are not in the same lane and are not in adjacent lanes, the semantic map generating system 100 fits four lines to the data: one line to the left key points 104 of the first trace point 102, one line to right key points 106 of the first trace point 102, one line to the left key points 114 of the second trace point 112, and one line to the right key points 116 of the second trace point 112. The semantic map generating system 100 includes a minimum distance between the lines associated with the first trace point and the lines associated with the second trace point. The line fitting is based on least squares. For each fit, the resulting value is the mean square root of the errors (MSE), which is linked to the measurement probability. The semantic map generating system 100 uses the MSE to find the most probable relationship between trace points. As such, the lower the MSE, the higher the likelihood of the corresponding relationship.

Figure 2A:
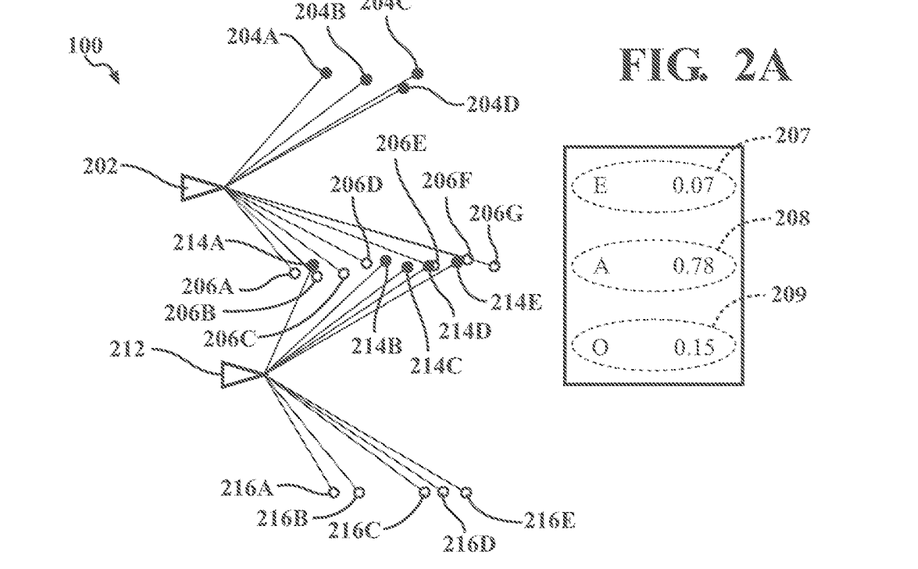
FIGS. 2A-2C illustrate another example of determining a relationship between two trace points based on key points associated with the trace points.
Figures 2B, 2C:
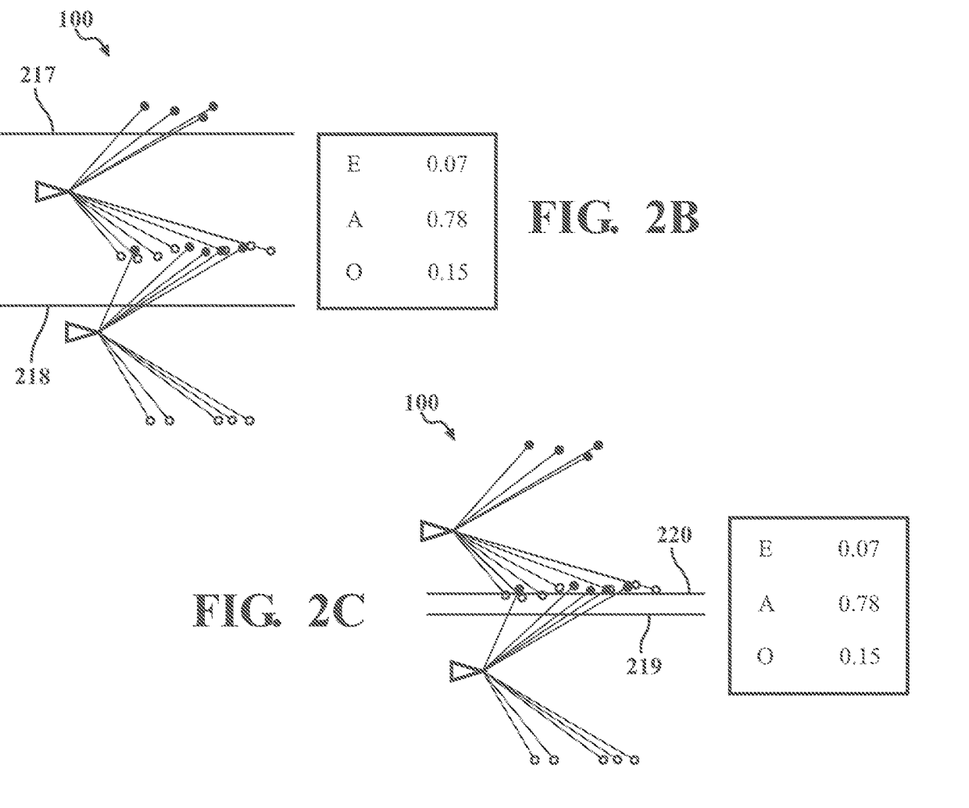

FIGS. 2A-2C illustrate an example of determining a relationship between trace points 202, 212 based on key points associated with the trace points 202, 212. As previously mentioned, the semantic map generating system 100 receives sensor data from any suitable sensors. As an example and as shown in FIG. 2A, sensor data includes trace points 202, 212 which identify the positions of a vehicle travelling across the road portion. The trace points 202, 212 may originate from a single vehicle travelling across the road portion. Alternatively, the trace points 202, 212 may originate from two vehicles travelling across the road portion. The sensor data includes left key points 204A, 204B, 204C, 204D (collectively known as 204), which identify a left boundary of a lane that the vehicle is traveling on. The sensor data includes right key points 206A, 206B, 206C, 206D, 206E, 206F, 206G (collectively known as 206), which identify a right boundary of the lane that the vehicle is traveling on. In this example, when the vehicle is at the trace point 202, sensors on the vehicle detect left lane markings at the left key points 204 and right lane markings at the right key points 206.

The sensor data includes left key points 214A, 214B, 214C, 214D, 214E (collectively known as 214), which identify a left boundary of a lane that the vehicle is traveling on. The sensor data includes right key points 216A, 216B, 216C, 216D, 216E (collectively known as 216), which identify a right boundary of the lane that the vehicle is traveling on. In this example, when the vehicle is at the trace point 212, sensors on the vehicle detect left lane markings at the left key points 214 and right lane markings at the right key points 216.

The semantic map generating system 100 determines the different relationships that can exist between the trace points 202, 212. As previously mentioned, the relationship between the trace points may be that the trace points are in a same lane, that the trace points are in adjacent lanes, or that the trace points are neither in the same nor in adjacent lanes.

The semantic map generating system 100 determines three probability values 207, 208, 209. The semantic map generating system 100 determines a first probability value 207, indicating the probability that the trace points 202, 212 are in the same lane, a second probability value 208, indicating the probability that the trace points 202, 212 are in adjacent lanes, and a third probability value indicating the probability that the trace points 202, 212 are in two separate lanes, and the two separate lanes are not adjacent to each other.

The semantic map generating system 100 determines the first probability value 207 by fitting a curve or a line 217 to the left key points 204, 214 and a curve or a line 218 to the right key points 206, 216. The semantic map generating system 100 assigns a score to the curves 217, 218 based on how closely the associated curves 217, 218 fit the key points 204, 214, 206, 216. The semantic map generating system 100 may use any suitable method to fit the curves 217, 218 to the key points 204, 214, 206, 216 and determine a fit score. As shown in FIG. 2B, the curves 217, 218 are relatively distant from the key points 204, 214, 206, 216, and as such, the first probability value indicating that the trace points 202, 212 are in the same lane is relatively low.

The semantic map generating system 100 determines the second probability value 208 by fitting a curve or a line 219 to the left key points 204 and the right key points 216 and by fitting a curve or a line 220 to the right key points 206 and the left key points 214. The semantic map generating system 100 then assigns a score to the curves 219, 220 based on how closely the associated curves 219, 220 fit the key points 204, 214, 206, 216. The semantic map generating system 100 may select the curve 219, 220 with a better fit and determine the second probability value 108 indicating that the trace points are in adjacent lanes based on the curve 219, 220 with a better fit. As shown in FIG. 2C, the curve 220 fits the right key points 206 and the left key points 214 better than the curve 219 fits the left key points 204 and the right key points 216. The semantic map generating system 100 may determine that one curve 220 is a better fit than the other curve 219 using the least squares method. The semantic map generating system 100 then determines a second probability value indicating the probability that the trace points are in adjacent lanes.

The semantic map generating system 100 determines the third probability value 209. As previously mentioned, the third probability value indicates the probability that the trace points 202, 212 do not have a relationship or have a relationship other than being in the same lane or being in adjacent lanes. As an example and as shown, the semantic map generating system 100 may determine the third probability value 209 by subtracting the sum of the first and second probability values 207, 208 from 1.

FIGS. 3A-3F illustrate an example of determining characteristics of the road portion 300 based on the relationship between the trace points 302, 304, 306. As previously mentioned, the semantic map generating system 100 receives sensor data that includes trace points 302, 304, 306 and key points 322 associated with the trace points 302, 304, 306. As disclosed above, the semantic map generating system 100 determines a relationship between the trace points 302, 304, 306. As an example, the semantic map generating system 100 may determine the relationship between trace points 302, 304, 306 that are within a certain radius of each other. As another example, the semantic map generating system 100 may determine the relationship between neighboring trace points 302, 304, 306. In such an example, the semantic map generating system 100 may determine the relationship between two trace points 302, 304, 306 that are closest to each other.

Figure 3A:
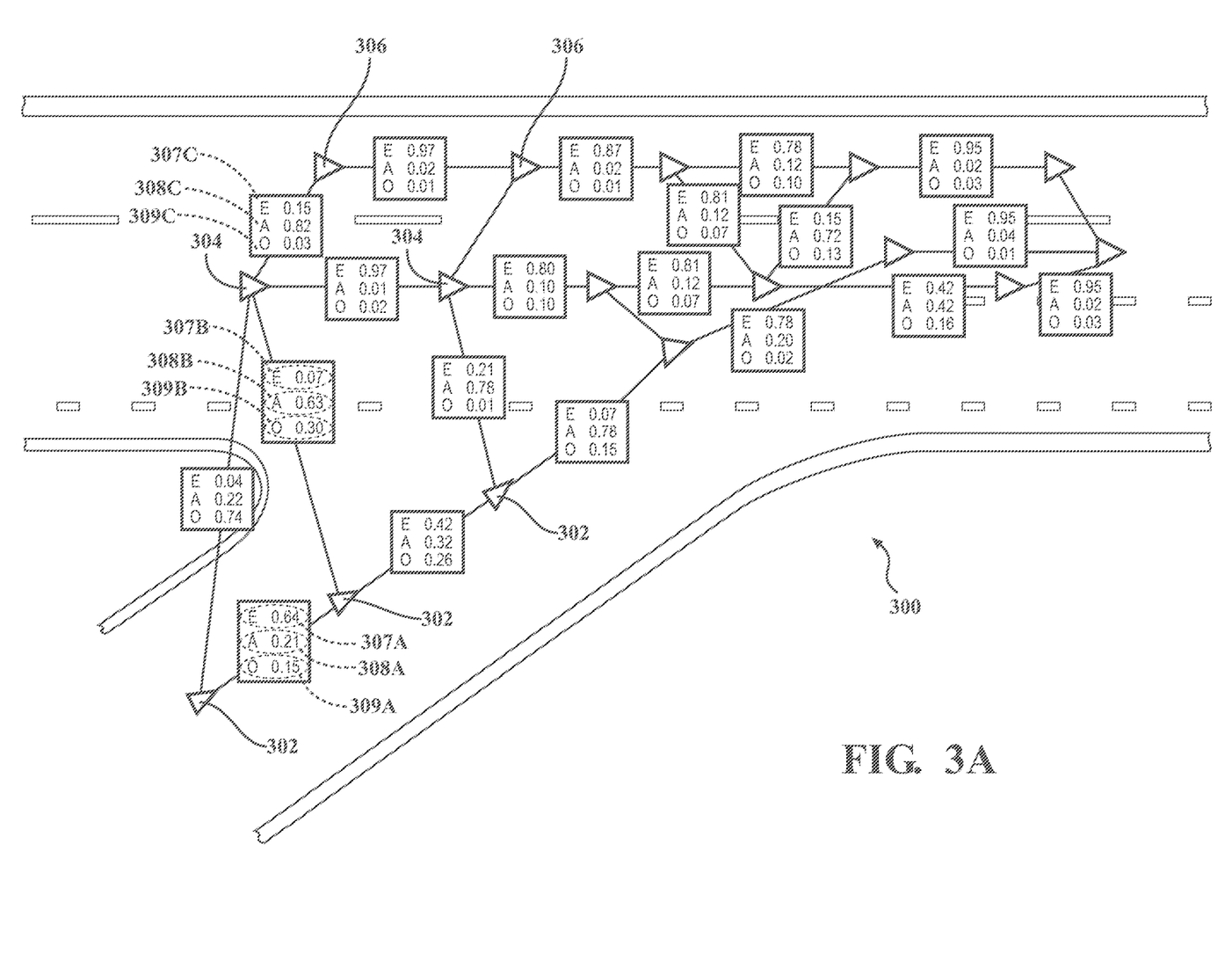
FIGS. 3A-3F illustrate an example of generating a semantic map of a road portion.
Figure 3B:
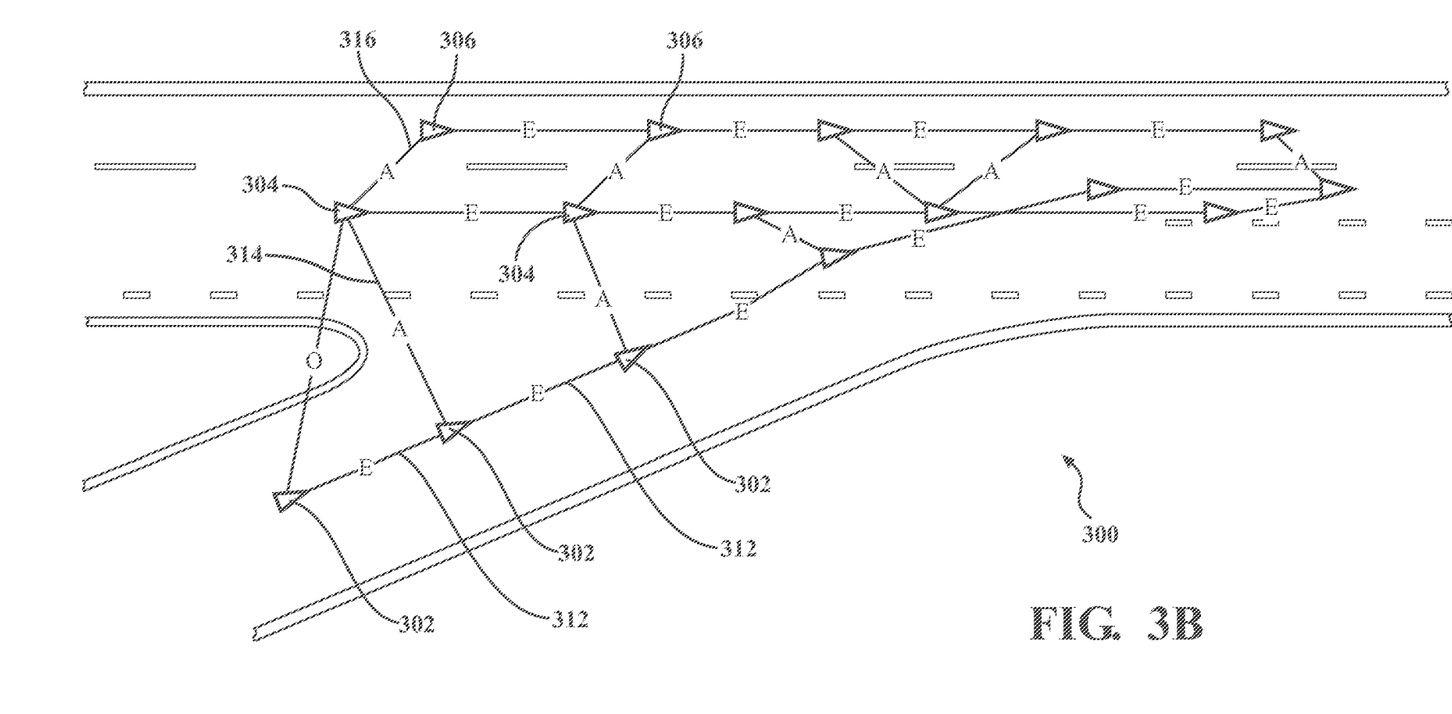

The semantic map generating system 100 infers a map highlighting the locations and orientations of the lanes based on the relationships between the trace points 302 as shown in FIGS. 3A-3B. As an example and as shown, the semantic map generating system 100 infers the lanes such that trace points 302 with a high probability of being in the same lane, as indicated by the ego probability value 307A being higher than both the adjacent probability value 308A and the other probability value 309A, are in the same lane. The semantic map generating system 100 further infers lanes adjacent to each other such that trace points 302, 304 with a high probability of being in adjacent lanes are within adjacent lanes, as indicated by the adjacent probability value 308B being higher than the ego probability value 307B and the other probability value 309B.

As an example and as shown in FIGS. 3A-3B, the semantic map generating system 100 can solve the relationship between trace points 302 by selecting the highest probability value from the three probability values—ego 307A, adjacent 308A, and other 309A, and inferring connecting lines 312 based on the relationship associated with the highest probability value. As another example, the semantic map generating system 100 can solve the relationship between trace points 302, 304 by selecting the highest probability value from the three probability values—ego 307B, adjacent 308B, and other 309B, and inferring connecting lines 314 based on the relationship associated with the highest probability value. As yet another example, the semantic map generating system 100 can solve the relationship between trace points 304, 306 by selecting the highest probability value from the three probability values—ego 307C, adjacent 308C, and other 309C, and inferring connecting lines 316 based on the relationship associated with the highest probability value. The connecting lines 312, 314, 316 can be marked as E (for ego), A (for adjacent), or O (for other) as shown in FIG. 3B.

Figure 3C:
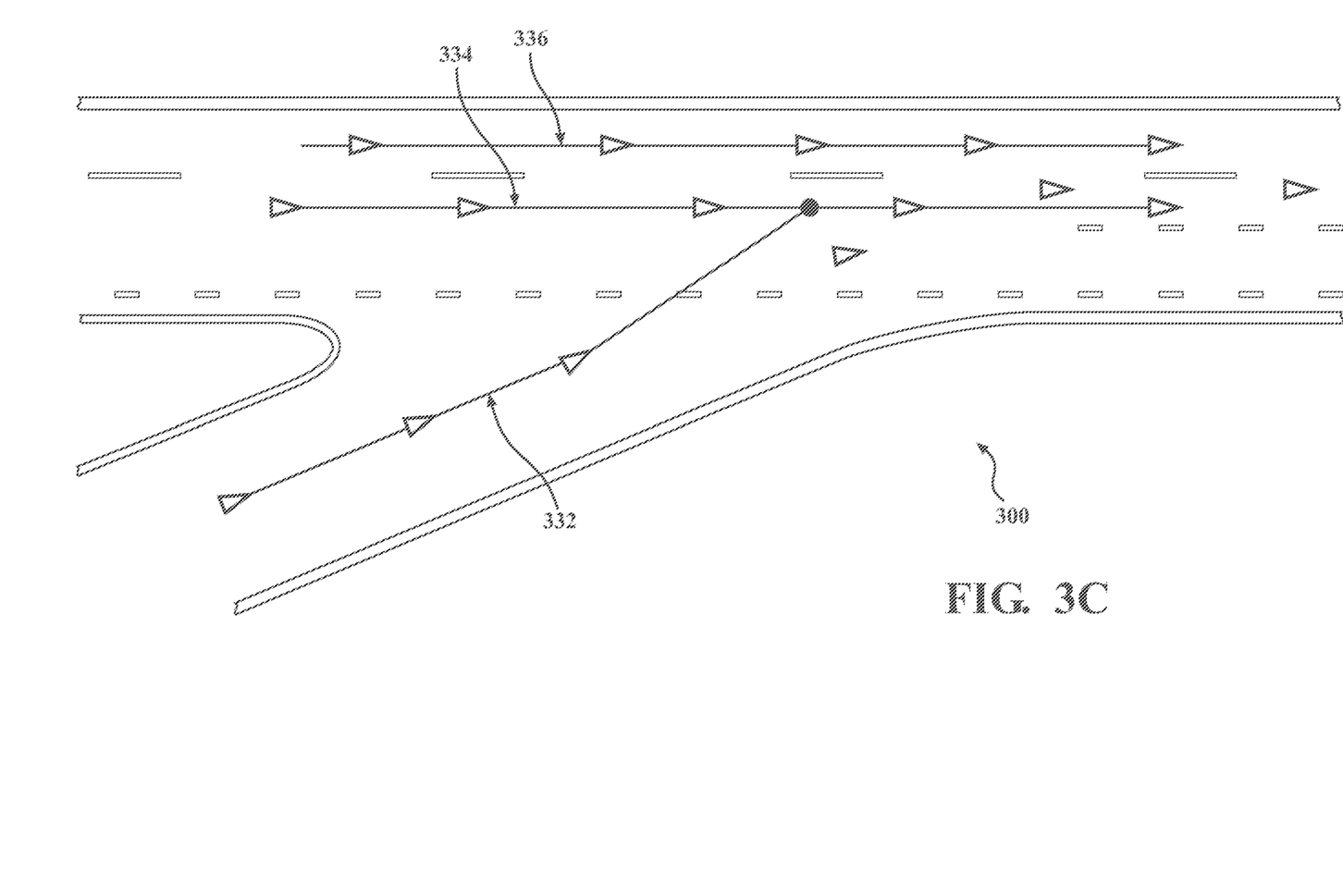
Figure 3D:
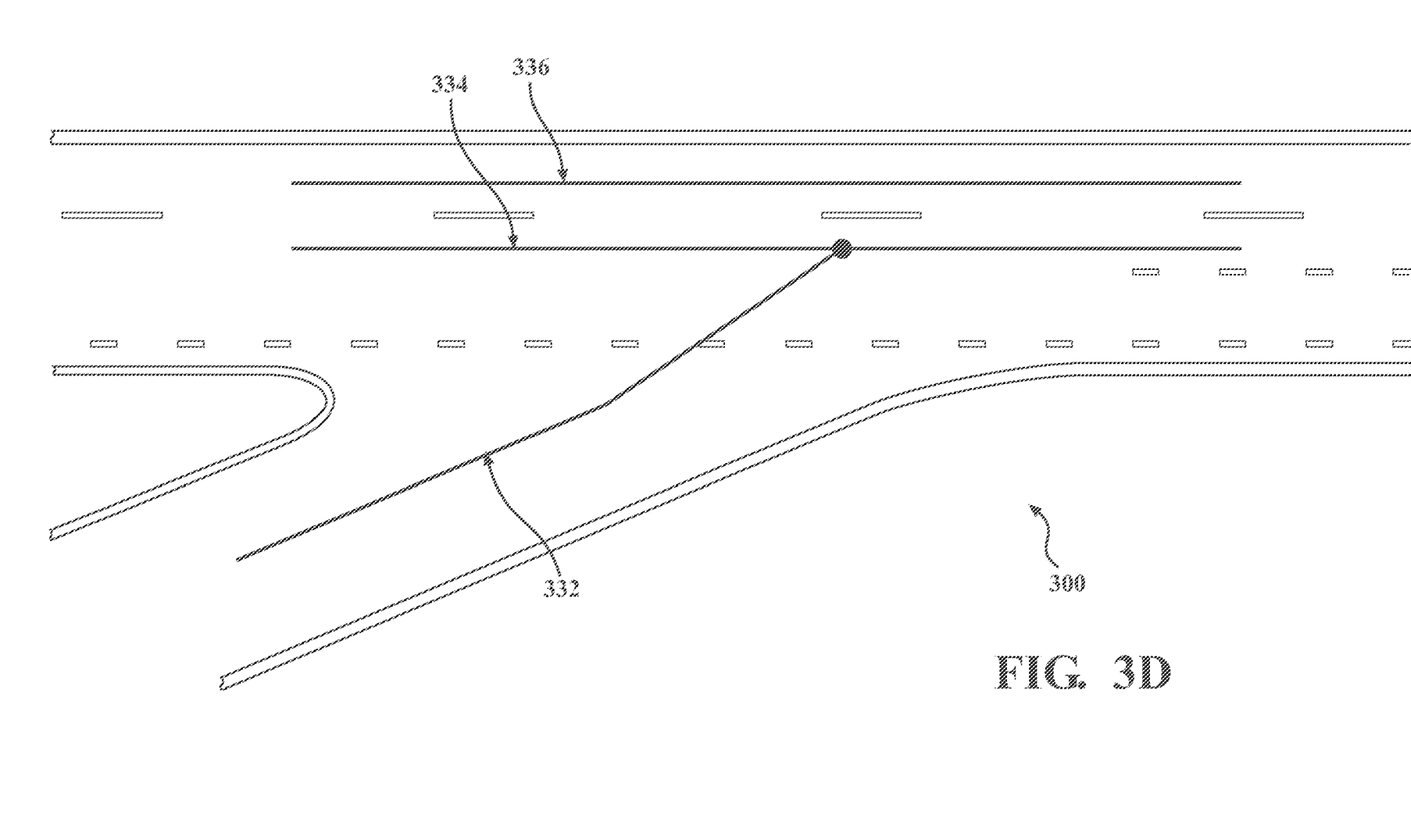

As illustrated in FIGS. 3C-3D, the semantic map generating system 100 retains the connecting lines 312 that are marked E to indicate the location and orientation of the lanes 332, 334, 336. The semantic map generating system 100 computes centerlines for all lanes by retaining a certain trajectory and/or by averaging all trajectories within a lane, as an example. In a case where there is no trajectory that covers the entire length of a lane, the semantic map generating system may use averaging or any suitable technique that utilizes multiple trajectories.

Figure 3E:
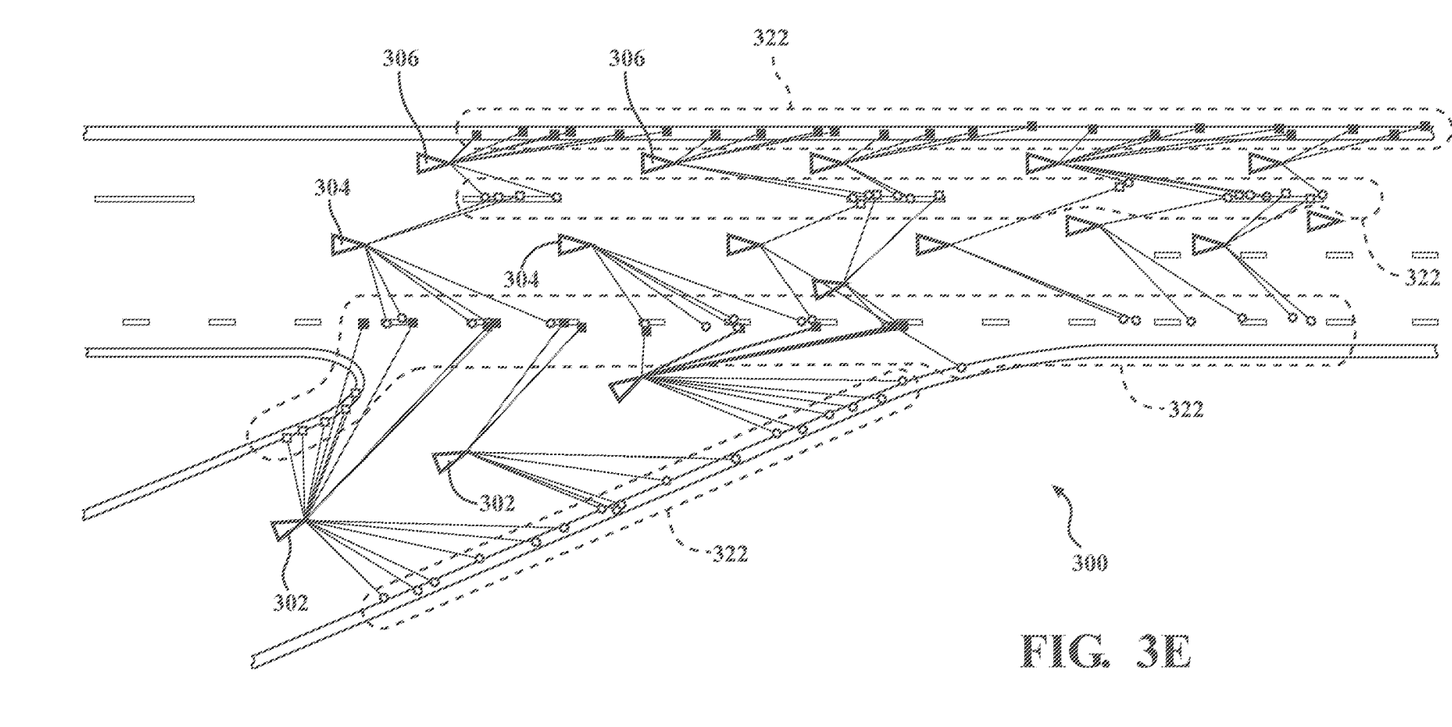
Figure 3F:
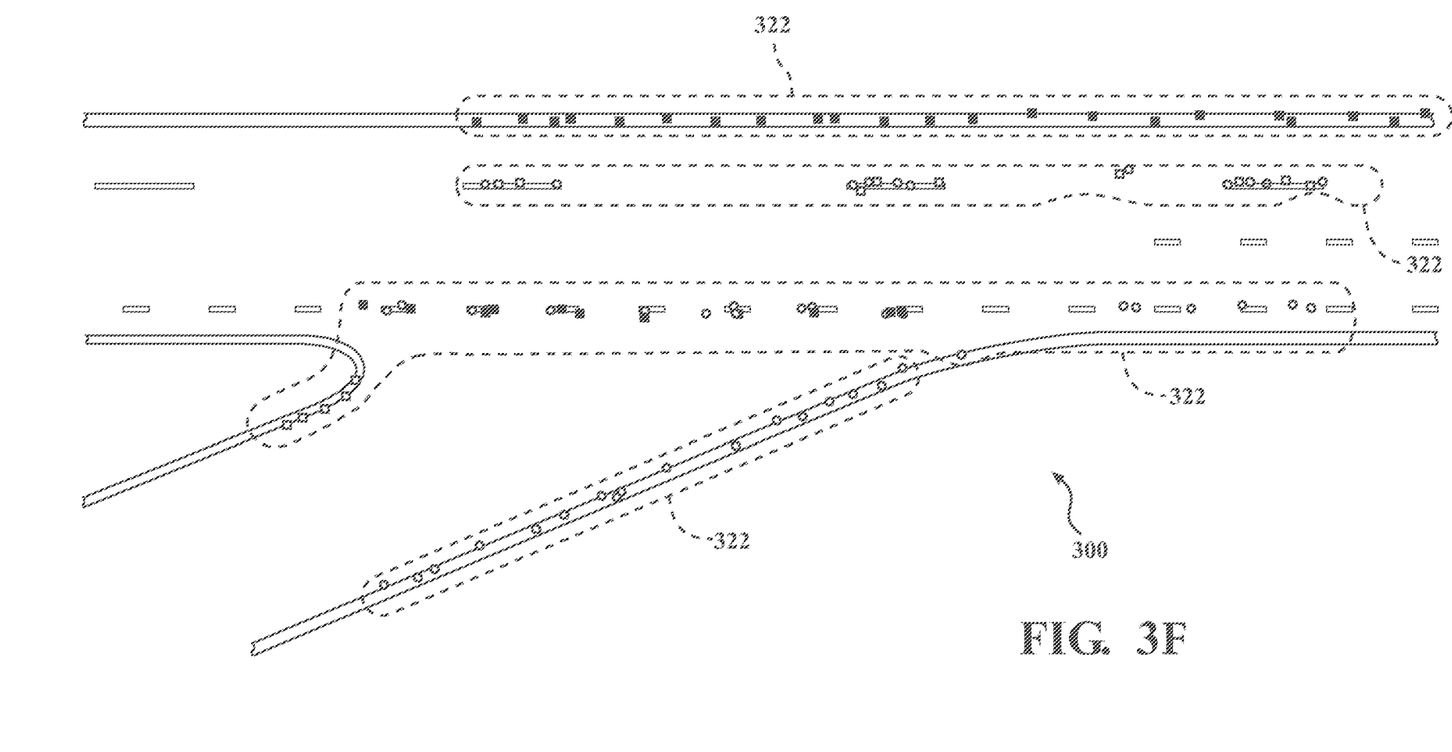

As an example and as shown in FIGS. 3D-3F, the semantic map generating system 100 identifies the trace points 302, 304, 306 associated with the connecting lines 312, 314, 316 for the different lanes 332, 334, 336, and further identifies the key points 322 associated with the trace points 302, 304, 306. The semantic map generating system 100 then infers the boundaries of the lanes 332, 334, 336 based on the key points 322.

Figure 4:
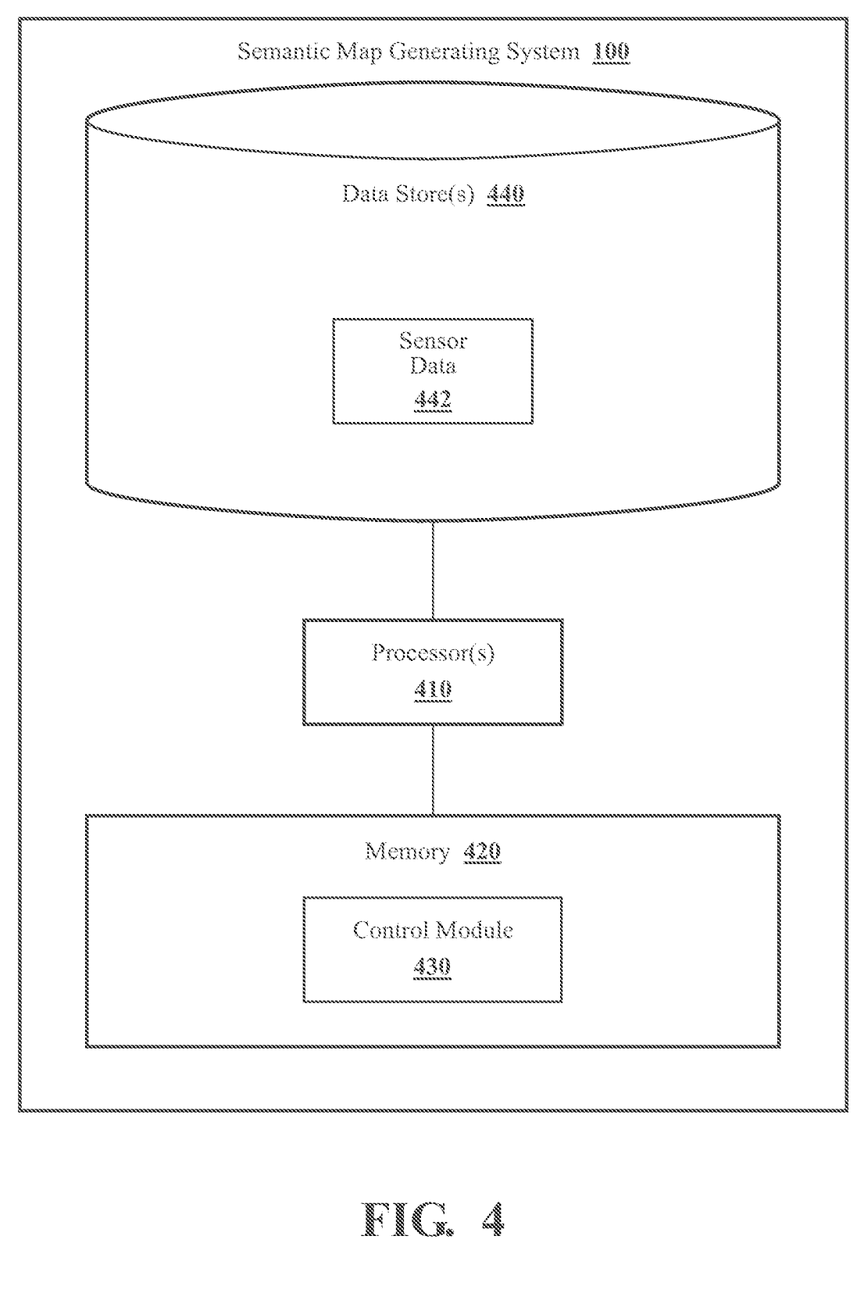
FIG. 4 illustrates one embodiment of the semantic map generating system.

With reference to FIG. 4, one embodiment of the semantic map generating system 100 of FIGS. 1 and 2 is further illustrated. The semantic map generating system 100 is shown as including a processor 410. Accordingly, the processor 410 may be a part of the semantic map generating system 100, or the semantic map generating system 100 may access the processor 410 through a data bus or another communication path. In one or more embodiments, the processor 410 is an application-specific integrated circuit (ASIC) that is configured to implement functions associated with a control module 430. In general, the processor 410 is an electronic processor, such as a microprocessor, which is capable of performing various functions as described herein.

In one embodiment, the semantic map generating system 100 includes a memory 420 that stores the control module 430 and/or other modules that may function in support of generating a semantic map of a road. The memory 420 is a random-access memory (RAM), read-only memory (ROM), a hard disk drive, a flash memory, or another suitable memory for storing the control module 430. The control module 430 is, for example, machine-readable instructions that, when executed by the processor 410, cause the processor 410 to perform the various functions disclosed herein. In further arrangements, the control module 430 is a logic, integrated circuit, or another device for performing the noted functions that includes the instructions integrated therein.

Furthermore, in one embodiment, the semantic map generating system 100 includes a data store 440. The data store 440 is, in one arrangement, an electronic data structure stored in the memory 420 or another data store, and that is configured with routines that can be executed by the processor 410 for analyzing stored data, providing stored data, organizing stored data, and so on. Thus, in one embodiment, the data store 440 stores data used by the control module 430 in executing various functions.

For example, as depicted in FIG. 4, the data store 440 includes the sensor data 442 along with, for example, other information that is used and/or produced by the control module 430. The sensor data 442 includes information about the trace points 102, 112, 202, 212, 302, 304, 306 and the key points 104, 106, 114, 116, 204, 206, 214, 216, 322. Vehicle sensors and/or any other suitable sensors may detect the trace points 102, 112, 202, 212, 302, 304, 306 and the key points 104, 106, 114, 116, 204, 206, 214, 216, 322.

While the semantic map generating system 100 is illustrated as including the various data elements, it should be appreciated that one or more of the illustrated data elements may not be included within the data store 440 in various implementations and may be included in a data store that is external to the semantic map generating system 100. In any case, the semantic map generating system 100 stores various data elements in the data store 440 to support functions of the control module 430.

In one embodiment, the control module 430 includes instructions that, when executed by the processor(s) 410, cause the processor(s) 410 to receive sensor data 442 related to a road portion 110. As previously mentioned, the sensor data 442 includes a plurality of trace points 302, 304, 306 and a plurality of key points 322 associated with the plurality of trace points 302, 304, 306. The trace points 302, 304, 306 are related to positions of a vehicle in the road portion 300, and the key points 322 are related to lane boundaries as detected by the vehicle sensors and/or other sensors.

In one or more arrangements, the control module 430 receives sensor data 442 related to a portion of a road. Additionally and/or alternatively, the control module 430 may receive the sensor data 442 related to a road portion 300 which is a portion of the road. The portion of the road may include an intersection such as shown in FIGS. 3A-3F. The sensor data 442 may be from vehicle sensors or any other suitable sensors. The control module 430 may receive the sensor data 442 from the vehicle sensors and/or the other sensors. As previously mentioned, the sensor data 442 may include the positions 102, 112, 202, 212, 302, 304, 306 of vehicles and the positions 104, 106, 114, 116, 204, 206, 214, 216, 322 of detected lane markings. In other words, the sensor data 442 may include the positions 102, 112, 202, 212, 302, 304, 306 of vehicles and vehicle sensors (also known as trace points) and the positions 104, 106, 114, 116, 204, 206, 214, 216, 322 of lane markings (also known as key points) detected by the vehicle sensor(s) while in the position 102, 112, 202, 212, 302, 304, 306.

In one or more arrangements, the key points may include one or more key points. The key points may include at least a left key point and a right key point. The left key point is associated with a left lane boundary, that is a lane boundary that is left relative to the direction of travel of the vehicle sensor. The right key point is associated a right lane boundary, which is a lane boundary that is right relative to the direction of travel of the vehicle sensor.

In one embodiment, the control module 430 includes instructions that, when executed by the processor(s) 410, cause the processor(s) 410 to determine a relationship between the trace points 102, 112, 202, 212, 302, 304, 306 based on the associated key points 104, 106, 114, 116, 204, 206, 214, 216, 322. The relationship between the trace points can be that the trace points are in the same lane, the trace points are in adjacent lanes, or the trace points are in non-adjacent lanes.

In one or more arrangements, the control module 430 generates a first lane configuration based on the two trace points being in the same lane, a second lane configuration based on the two trace points being in adjacent lanes with a first of the trace points in the left lane and a second of the trace points in the right lane, and a third lane configuration based on the two trace points being in adjacent lanes with the first of the trace points in the right lane and the second of the trace points in the left lane.

To determine the probability that two trace points are in the same lane, the control module 430 fits a first curve or line to the left key points associated with the two trace points. Similarly, the control module 430 fits a second curve or line to the right key points associated with the two trace points. The control module 430 may use any suitable method such as a least squares method to fit the curves to the key points. The control module 430 may then determine how accurate the fit is by measuring the variance between the left key points and the first curve and further measuring the variance between the right key points and the second curve. The control module 430 may determine a value and/or a probability that the two trace points are in the same lane based on the measured variances. The lower the variance between the key points and the curves, the more accurate the curves are and the higher the probability that the two trace points are in the same lane. The control module 430 may assign the probability value to the ego value 107, 207.

To determine the probability that two trace points 102, 112, 202, 212 are in adjacent lanes with a first 102, 202 of the two trace points 102, 112, 202, 212 in the left adjacent lane and a second 112, 212 of the two trace points 102, 112, 202, 212 in the right adjacent lane, the control module 430 fits a curve or line 120, 220 to the right key points 106, 206 associated with the first trace point 102, 202 and the left key points 114, 214 associated with the second trace point 112, 212. The control module 430 may use any suitable method such as a least squares method to fit the curve 120, 220 to the key points 106, 114, 206, 214. The control module 430 may then determine how accurate the fit is by measuring the variance between the key points 106, 114, 206, 214 and the curve 120, 220. The control module 430 may determine a value and/or a probability that the two trace points 102, 112, 202, 212 are in adjacent lanes with the first trace point 102, 202 in the left adjacent lane and the second trace point 112, 212 in the right adjacent lane based on the measured variances. The lower the variance between the key points 106, 114, 206, 214 and the curves 120, 220, the more accurate the curves 120, 220 are and the higher the probability that the first trace point 102, 202 is in the left adjacent lane and the second trace point 112, 212 is in the right adjacent lane.

To determine the probability that two trace points 102, 112, 202, 212 are in adjacent lanes with a first 102, 202 of the two trace points 102, 112, 202, 212 in the right adjacent lane and a second 112, 212 of the two trace points 102, 112, 202, 212 in the left adjacent lane, the control module 430 fits a curve or line 119, 219 to the right key points 116, 216 associated with the second trace point 112, 212 and the left key points 104, 204 associated with the first trace point 102, 202. The control module 430 may use any suitable method such as a least squares method to fit the curve 119, 219 to the key points 104, 116, 204, 216. The control module 430 may then determine how accurate the fit is by measuring the variance between the key points 104, 116, 204, 216 and the curve 119, 219. The control module 430 may determine a value and/or a probability that the two trace points 102, 112, 202, 212 are in adjacent lanes with the first trace point 102, 202 in the right adjacent lane and the second trace point 112, 212 in the left adjacent lane based on the measured variances. The lower the variance between the key points 104, 116, 204, 216 and the curves 119, 219, the more accurate the curves 119, 219 are and the higher the probability that the first trace point 102, 202 is in the right adjacent lane and the second trace point 112, 212 is in the left adjacent lane.

The control module 430 may compare the value that the trace points are in adjacent lanes and the first trace point is in the left adjacent lane with the value that the trace points are in adjacent lanes and the first trace point is in the right adjacent lane. The control module 430 may then select the higher of the two values as the probability that the two trace points are in adjacent lanes and assign the value to the adjacent value 108, 208.

The control module 430 may determine the other value 109, 209 by subtracting the sum of the ego value 107, 207 and the adjacent value 108, 208 from a number such as 1. As previously mentioned, the other value 109, 209 indicates that the trace points 102, 112, 202, 212 are not in the same lane and are not in adjacent lanes. As such, the other value 109, 209 indicates that the trace points 102, 112, 202, 212 are in non-adjacent lanes.

As such, the control module 430 assigns a first value (also known as the ego value 107, 207) indicating a likelihood that the relationship is trace points in a same lane based on the associated key points, assigns a second value (also known as the adjacent value 108, 208) indicating a likelihood that the relationship is trace points in adjacent lanes based on the associate key points, and assigns a third value (also known as the other value 109, 209) indicating a likelihood that the relationship is trace points in non-adjacent lanes based on the plurality of key points. The control module 430 then determines the most likely relationship between the trace points based on highest of the three values—the first or ego value, the second or adjacent value, and the third or other value.

The control module 430 may select the two trace points for which a relationship will be determined based on any suitable criteria. As an example, the control module 430 may select and determine the relationship between trace points that are within a predetermined proximity to each other. In such an example, the control module 430 may determine the relationship between trace points within a certain radius, e.g., 4 meters of each other. As another example, the control module 430 may select a certain number of neighboring trace points to a first trace point and determine a relationship between each of the neighboring trace points and the first trace point. In such an example, the control module 430 may select and determine a relationship between 5 or 10 neighboring trace points and the first trace point.

As another example, the control module 430 may select and determine a relationship between trace points that share a characteristic such as a similar time stamp or time range. In such an example, the control module 430 may determine a relationship between trace points that occurred within a 24-hour period, a week, or a month.

In one embodiment, the control module 430 includes instructions that, when executed by the processor(s) 410, cause the processor(s) 410 to determine characteristics of the road portion based on the relationship. The characteristics can include the number of lanes in the road portion, a width of one or more lanes in the road portion, a position of one or more lane markings on the road portion, a position of an intersection between two or more lanes, and a position of one or more boundaries of the road portion.

In one embodiment, the control module 430 may determine a trajectory for a lane based on the relationship between the trace points 302, 304, 306 and further determine the characteristics of the road portion based on the trajectory. As an example and as shown in FIGS. 3A-3B, the control module 430 may connect neighboring trace points 302, 304, 306 based on the determined relationship 312, 314, 316 between the neighboring trace points 302, 304, 306. As an example and as shown in FIGS. 3C-3D, the control module 430 may determine the trajectory 332, 334, 336 of the lanes that the trace points 302, 304, 306 are on using the connections developed from the determined relationships 312, 314, 316. As an example and as shown in FIGS. 3E-3F, the control module 430 may then infer the key points 322 associated with the trace points 302, 304, 306 to determine the lane boundaries and/or intersections. The control module 430 may further deduce the characteristics of the road portion based on the relationship between the trace points 302, 304, 306, lane boundaries and/or intersections.

The control module 430 may then generate and/or update a semantic map of the road portion. The control module 430 may transmit the characteristics of the road portion to any suitable entity such as a map database or a traffic database.

Figure 5:
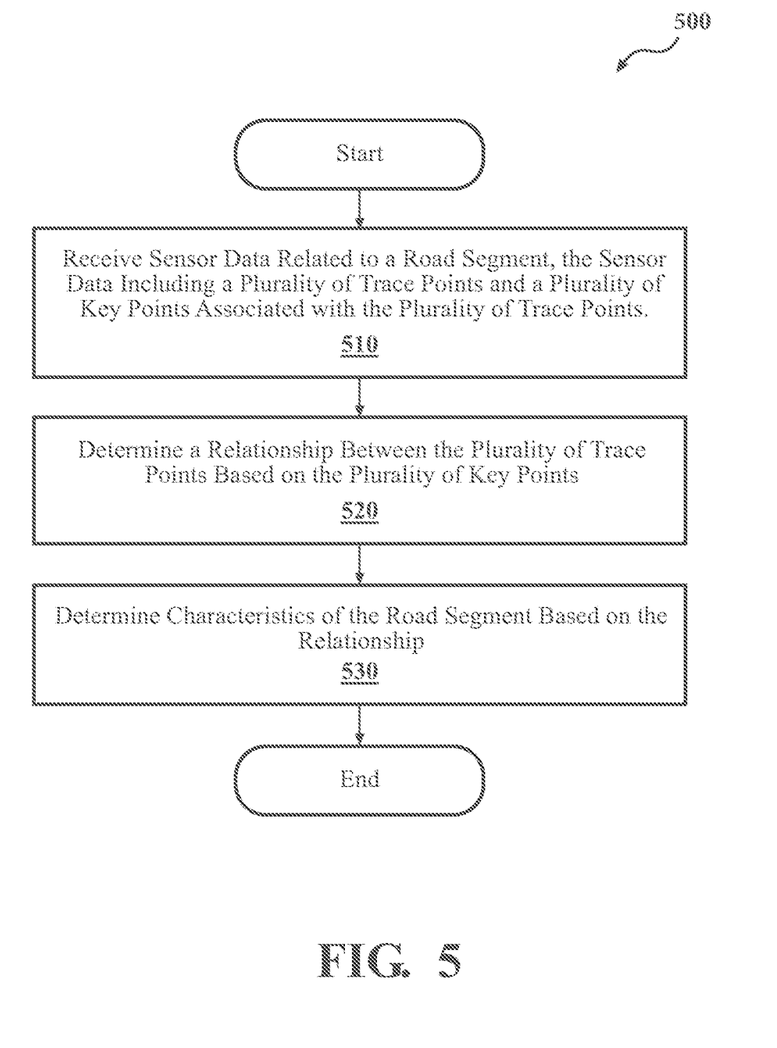
FIG. 5 is a flowchart illustrating one embodiment of a method associated with generating a semantic map for a road portion.

FIG. 5 is a flowchart illustrating one embodiment of a method 500 associated with generating a semantic map for a road. The method 500 will be described from the viewpoint of the semantic map generating system 100. However, the method 500 may be adapted to be executed in any one of several different situations and not necessarily by the semantic map generating system 100.

At step 510, the control module 430 may cause the processor(s) 410 to receive sensor data 442 related to the road portion. As previously mentioned, the sensor data 442 includes trace points 102, 112, 202, 212 and key points 104, 106, 114, 116, 204, 206, 214, 216 from sensors on multiple vehicles.

At step 520, the control module 430 may cause the processor(s) 410 to determine a relationship between the trace points 102, 112, 202, 212 based on the key points 104, 106, 114, 116, 204, 206, 214, 216. As previously mentioned, the relationship can be that the trace points 102, 112, 202, 212 are in the same lane, the trace points 102, 112, 202, 212 are in adjacent lanes, or the trace points 102, 112, 202, 212 are in non-adjacent lanes. The control module 430 may determine the relationship using any suitable method such as least squares method, as described above. The control module 430 may assign a first value 107, 207 indicating a likelihood that the relationship is that the trace points are in the same lane, a second value 108, 208 indicating a likelihood that the relationship is that the trace points are in adjacent lanes, and a third value 109, 209 indicating a likelihood that the relationship is that the trace points are in non-adjacent lanes. The control module 430 may then determine the relationship between the trace points 102, 112, 202, 212 based on the highest of the first 107, 207, second 108, 208, and third 109, 209 values.

At step 530, the control module 430 may cause the processor(s) 410 to determine the characteristics of the road portion based on the relationship. The characteristics can include geometry of the lane boundaries, i.e. polylines, the number of lanes in the road portion, a width of one or more lanes in the road portion, a position of one or more lane markings on the road portion, a position of an intersection between two or more lanes, and a position of one or more boundaries of the road portion. As previously disclosed, the control module 430 can determine a trajectory for a lane based on the relationship and determine the characteristics of the road portion based on the trajectory.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
a processor; and
a memory storing machine-readable instructions that, when executed by the processor, cause the processor to:
receive sensor data related to a road portion, the sensor data including a plurality of trace points and a plurality of key points associated with the plurality of trace points, the plurality of trace points being related to positions of a vehicle in the road portion, the plurality of key points being related to lane boundaries;
determine a first probability that two of the trace points are in a same lane, a second probability that the two of the trace points are in adjacent lanes, and a third probability that the two of the trace points are not in the same lane and not in adjacent lanes based on fitting a first curve to the plurality of left key points and fitting a second curve to the plurality of right key points;
determine a relationship between the plurality of trace points based on the first probability, the second probability, and the third probability;
determine characteristics of the road portion based on the relationship, the characteristics including at least a width of one or more lanes in the road portion;

generate a semantic map of the road portion based on the characteristics; and
control operation of a vehicle based on the semantic map.

2. The system of claim 1, wherein the characteristics of the road portion include at least one of:
a number of lanes in the road portion;
a position of one or more lane markings on the road portion;
a position of an intersection between two or more lanes; or
a position of one or more boundaries of the road portion.

3. The system of claim 1, wherein the relationship is one of:
trace points in a same lane;
trace points in adjacent lanes; or
trace points in non-adjacent lanes.

4. The system of claim 1, wherein the machine-readable instructions further include instructions that when executed by the processor cause the processor to:
determine the relationship between the plurality of trace points that are within a predetermined proximity to each other.

5. The system of claim 1, wherein the machine-readable instructions further include instructions that when executed by the processor cause the processor to:
assign a first value indicating a likelihood that the relationship is trace points in a same lane based on the plurality of key points;
assign a second value indicating a likelihood that the relationship is trace points in adjacent lanes based on the plurality of key points;
assign a third value indicating a likelihood that the relationship is trace points in non-adjacent lanes based on the plurality of key points; and
determine the relationship based on the highest of the first value, the second value, and the third value.

6. The system of claim 1, wherein the machine-readable instructions further include instructions that when executed by the processor cause the processor to:
determine a trajectory for a lane based on the relationship; and
determine the characteristics of the road portion based on the trajectory.

7. The system of claim 1, wherein the plurality of key points includes one or more key points, wherein one of the one or more key points is associated with a left lane boundary and an other of the one or more key points is associated with a right lane boundary.

8. A method comprising:
receiving sensor data related to a road portion, the sensor data including a plurality of trace points and a plurality of key points associated with the plurality of trace points, the plurality of trace points being related to positions of a vehicle in the road portion, the plurality of key points being related to lane boundaries;
determining a first probability that two of the trace points are in a same lane, a second probability that the two of the trace points are in adjacent lanes, and a third probability that the two of the trace points are not in the same lane and not in adjacent lanes based on fitting a first curve to the plurality of left key points and fitting a second curve to the plurality of right key points;
determining a relationship between the plurality of trace points based on the first probability, the second probability, and the third probability;
determining characteristics of the road portion based on the relationship, the characteristics including at least a width of one or more lanes in the road portion;
generating a semantic map of the road portion based on the characteristics; and
controlling operation of a vehicle based on the semantic map.

9. The method of claim 8, wherein the characteristics of the road portion include at least one of:
a number of lanes in the road portion;
a position of one or more lane markings on the road portion;
a position of an intersection between two or more lanes; or
a position of one or more boundaries of the road portion.

10. The method of claim 8, wherein the relationship is one of:
trace points in a same lane;
trace points in adjacent lanes; or
trace points in non-adjacent lanes.

11. The method of claim 8, further comprising:
determining the relationship between the plurality of trace points that are within a predetermined proximity to each other.

12. The method of claim 8, further comprising:
assigning a first value indicating a likelihood that the relationship is trace points in a same lane based on the plurality of key points;
assigning a second value indicating a likelihood that the relationship is trace points in adjacent lanes based on the plurality of key points;
assigning a third value indicating a likelihood that the relationship is trace points in non-adjacent lanes based on the plurality of key points; and
determining the relationship based on the highest of the first value, the second value, and the third value.

13. The method of claim 8, further comprising:
determining a trajectory for a lane based on the relationship; and
determining the characteristics of the road portion based on the trajectory.

14. The method of claim 8, wherein the plurality of key points includes one or more key points, wherein one of the one or more key points is associated with a left lane boundary and an other of the one or more key points is associated with a right lane boundary.

15. A non-transitory computer-readable medium including instructions that when executed by a processor cause the processor to:
receive sensor data related to a road portion, the sensor data including a plurality of trace points and a plurality of key points associated with the plurality of trace points, the plurality of trace points being related to positions of a vehicle in the road portion, the plurality of key points being related to lane boundaries;
determine a first probability that two of the trace points are in a same lane, a second probability that the two of the trace points are in adjacent lanes, and a third probability that the two of the trace points are not in the same lane and not in adjacent lanes based on fitting a first curve to the plurality of left key points and fitting a second curve to the plurality of right key points;
determine a relationship between the plurality of trace points based on the first probability, the second probability, and the third probability that the two of the trace points are not in the same lane and not in adjacent lanes;

determine characteristics of the road portion based on the relationship, the characteristics including at least a width of one or more lanes in the road portion;

generate a semantic map of the road portion based on the characteristics; and control operation of a vehicle based on the semantic map.

16. The non-transitory computer-readable medium of claim 15, wherein the characteristics of the road portion include at least one of:

a number of lanes in the road portion;

a position of one or more lane markings on the road portion;

a position of an intersection between two or more lanes; or a position of one or more boundaries of the road portion.

17. The non-transitory computer-readable medium of claim 15, wherein the relationship is one of:

trace points in a same lane;

trace points in adjacent lanes; or trace points in non-adjacent lanes.

18. The non-transitory computer-readable medium of claim 15, wherein the instructions further include instructions that when executed by the processor cause the processor to:

determine the relationship between the plurality of trace points that are within a predetermined proximity to each other.

19. The non-transitory computer-readable medium of claim 15, wherein the instructions further include instructions that when executed by the processor cause the processor to:

assign a first value indicating a likelihood that the relationship is trace points in a same lane based on the plurality of key points;

assign a second value indicating a likelihood that the relationship is trace points in adjacent lanes based on the plurality of key points;

assign a third value indicating a likelihood that the relationship is trace points in non-adjacent lanes based on the plurality of key points; and determine the relationship based on the highest of the first value, the second value, and the third value.

20. The non-transitory computer-readable medium of claim 15, wherein the instructions further include instructions that when executed by the processor cause the processor to:

determine a trajectory for a lane based on the relationship; and determine the characteristics of the road portion based on the trajectory.

* * * * *